(12) United States Patent
Reischl

(10) Patent No.: US 9,776,806 B2
(45) Date of Patent: Oct. 3, 2017

(54) PIVOT BEARING AND CONVEYING ROLLER FOR AN OBLIQUE MOUNTING OF THE SAME IN A CONVEYOR SYSTEM

(71) Applicant: TGW Mechanics GmbH, Wels (AT)

(72) Inventor: Josef Reischl, Gunskirchen (AT)

(73) Assignee: TGW Mechanics GmbH, Wels (AT)

( * ) Notice: Subject to any disclaimer, the term of this patent is extended or adjusted under 35 U.S.C. 154(b) by 0 days.

(21) Appl. No.: 15/028,066

(22) PCT Filed: Oct. 10, 2014

(86) PCT No.: PCT/AT2014/050241
§ 371 (c)(1),
(2) Date: Jun. 17, 2016

(87) PCT Pub. No.: WO2015/051391
PCT Pub. Date: Apr. 16, 2015

(65) Prior Publication Data
US 2016/0304290 A1    Oct. 20, 2016

(30) Foreign Application Priority Data

Oct. 11, 2013 (AT) .............................. A 50655/2013

(51) Int. Cl.
*B65G 13/06* (2006.01)
*B65G 39/12* (2006.01)

(52) U.S. Cl.
CPC .................... *B65G 39/12* (2013.01)

(58) Field of Classification Search
CPC ......... B65G 39/12; B65G 13/11; B65G 13/12
USPC .......................... 198/782, 788; 193/35 R, 37
See application file for complete search history.

(56) References Cited

U.S. PATENT DOCUMENTS

| 1,725,740 A | 8/1929 | Schulte |
| 4,241,825 A | 12/1980 | Brouwer |
| 4,832,185 A | 5/1989 | Huber |
| 5,022,513 A | 6/1991 | Huber |
| 5,088,596 A | 2/1992 | Agnoff |
| 5,442,248 A | 8/1995 | Agnoff |
| 5,582,286 A | 12/1996 | Kalm et al. |

(Continued)

FOREIGN PATENT DOCUMENTS

| DE | 957 376 C | 1/1957 |
| DE | 20 2004 020 677 U1 | 11/2005 |

(Continued)

OTHER PUBLICATIONS

International Search Report of PCT/AT2014/050241, dated Feb. 17, 2015.

(Continued)

*Primary Examiner* — William R Harp
(74) *Attorney, Agent, or Firm* — Collard & Roe, P.C.

(57) ABSTRACT

The invention relates to a conveying roller (1), wherein a first end of a shaft (2) in the part protruding from a roller body (3) has a shoulder (4) between a first section located on the roller side (5) having a larger first cross-section and a second section (6) located opposite therefrom having a smaller second cross-section. Finally, the invention also relates to an assembly (15) comprising a pivot bearing (18) and a conveying roller (1) of said type, and a conveyor system for the oblique and straight mounting of conveying rollers (1).

14 Claims, 5 Drawing Sheets

(56) References Cited

U.S. PATENT DOCUMENTS

Figure 1:
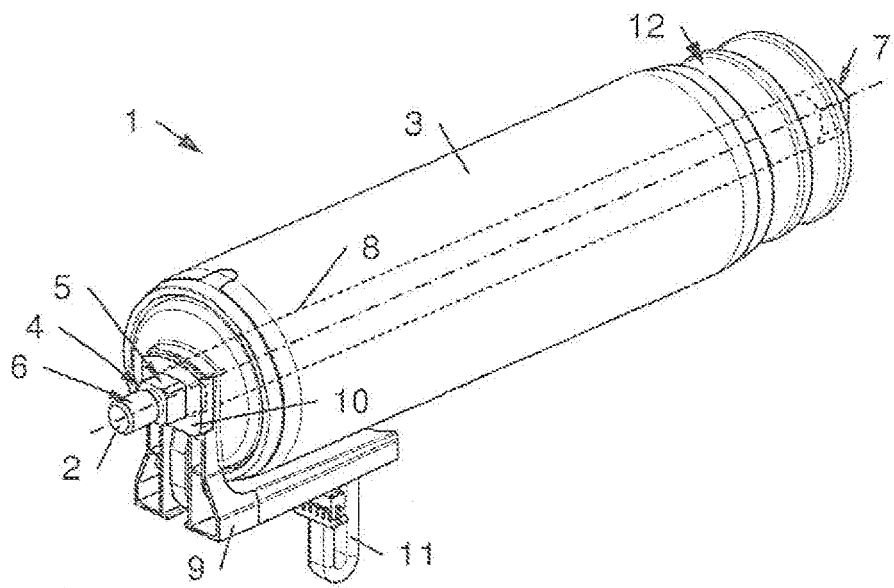

| | | |
|---|---|---|
| 6,206,181 B1 | 3/2001 | Syverson |
| 6,367,617 B1 | 4/2002 | Schiesser et al. |
| 6,447,336 B1 | 9/2002 | Fannin et al. |
| 6,672,449 B2 | 1/2004 | Nakamura et al. |
| 6,685,008 B2 * | 2/2004 | Schiesser ............... B65G 39/12 198/370.04 |
| 6,710,505 B1 | 3/2004 | Barani et al. |
| 6,718,101 B2 | 4/2004 | Le Noane et al. |
| 6,726,003 B2 | 4/2004 | Itoh et al. |
| 6,879,078 B2 | 4/2005 | Wolters |
| 7,035,714 B2 | 4/2006 | Anderson et al. |
| 7,362,016 B2 | 4/2008 | Cheng |
| 7,618,352 B1 | 11/2009 | Wei |
| 8,307,976 B2 | 11/2012 | Kraetz et al. |
| 8,381,901 B2 | 2/2013 | Yamamoto |
| 8,983,651 B2 | 3/2015 | Combs et al. |
| 9,150,357 B2 | 10/2015 | Hager |
| 2001/0037929 A1 | 11/2001 | Bond, Jr. et al. |
| 2004/0035684 A1 | 2/2004 | Fukuoka |
| 2004/0163934 A1 | 8/2004 | Kanaris |
| 2004/0195078 A1 | 10/2004 | Anderson et al. |
| 2007/0187132 A1 | 8/2007 | Watt |
| 2009/0166157 A1 | 7/2009 | Kraetz et al. |

FOREIGN PATENT DOCUMENTS

| | | |
|---|---|---|
| DE | 10 2004 043 197 A1 | 3/2006 |
| DE | 10 2010 002758 A1 | 9/2011 |
| EP | 0 300 128 A1 | 1/1989 |
| EP | 1 285 869 | 2/2003 |
| EP | 1 222 125 B1 | 10/2005 |
| EP | 2 455 310 A1 | 5/2012 |
| FR | 2 810 747 A1 | 12/2001 |
| GB | 2 435 124 A | 8/2007 |
| JP | S52-8882 U | 1/1977 |
| JP | S60-122615 A | 7/1985 |
| JP | H04-144812 A | 5/1992 |
| JP | H10-181829 A | 7/1998 |
| JP | 2000-247423 A | 9/2000 |
| JP | 2003-051362 A | 2/2003 |
| JP | 2010-235292 A | 10/2010 |
| WO | 2004/067416 A1 | 8/2004 |
| WO | 2007/036421 A1 | 4/2007 |
| WO | 2011/029120 A1 | 3/2011 |
| WO | 2011/032196 A1 | 3/2011 |
| WO | 2012/094690 A1 | 7/2012 |
| WO | 2013-000006 A2 | 1/2013 |

OTHER PUBLICATIONS

International Search Report of PCT/AT2014/050240, dated Feb. 13, 2015.
International Search Report of PCT/AT2014/050242, dated Feb. 18, 2015.
Response to European Patent Office in PCT/AT2014/050240, dated Sep. 4, 2016, with English translation of relevant parts.
Response to European Patent Office in PCT/AT2014/050241, dated Nov. 24, 2015, with English translation of relevant parts.
Response to European Patent Office in PCT/AT2014/050242, dated Aug. 6, 2015, with English translation of relevant parts.
Response to European Patent Office in PCT/AT2014/050265, dated Sep. 4, 2015, with English translation of relevant parts.
International Search Report in PCT/AT2014/050265, dated May 11, 2015.

* cited by examiner

PIVOT BEARING AND CONVEYING ROLLER FOR AN OBLIQUE MOUNTING OF THE SAME IN A CONVEYOR SYSTEM

CROSS REFERENCE TO RELATED APPLICATIONS

This application is the National Stage of PCT/AT2014/050241 filed on Oct. 10, 2014, which claims priority under 35 U.S.C. §119 of Austrian Application No. A 50655/2013 filed on Oct. 11, 2013, the disclosure of which is incorporated by reference. The international application under PCT article 21(2) was not published in English.

The invention relates to a conveying roller having a shaft and a cylindrical roller body mounted so as to be rotatable about this shaft. The invention further relates to an assembly, comprising a conveying roller of the aforementioned type. Finally, the invention also relates to a conveyor system for conveying objects, in particular loading aids such as containers, trays, by means of conveying rollers in several conveyor sections, comprising a first frame profile,
a second frame profile,
which first and second frame profiles extend parallel at a mutual distance apart from one another and in the conveying direction of the objects, and each having a vertical web with orifices disposed in it one after the other in the conveying direction for accommodating a shaft of the conveying rollers,
a first conveyor section, in which the conveying rollers are disposed between the first and second frame profiles with their shafts substantially normally to the web,
a second conveyor section, in which the conveying rollers are disposed between the first and second frame profiles with their shafts at an angle to the web,
at least one motorized conveying roller in the second conveyor section,
at least one pivot bearing in the second conveyor section, which provides a mount for the motorized conveying roller at one end by its shaft, comprising
a single-part or multi-part main body and
a pivot plate which is mounted on the main body in a seat so as to be rotatable about a pivot axis, comprising an orifice oriented normally with respect to said pivot axis and having guide surfaces extending normally with respect to the pivot axis,
and the pivot bearing is mounted on the frame profile by its main body by means of a releasable fixing device.

A conveying roller intended for oblique installation in a conveyor system is known in principle. A plurality of such conveying rollers is usually fitted in a conveyor system and at least some of them are motor-driven and thus assure the forward movement of the objects to be transported on the conveyor system. As a rule, the roller shafts are oriented normally with respect to the main conveying direction. In special applications, however, it may be necessary to orient the roller shafts obliquely with respect to the conveying direction, for example if the conveyed objects have to be oriented on a stop disposed laterally along the conveyor system or on a guide disposed laterally along the conveyor system. The obliquely positioned conveying rollers move the conveyed objects onto said stop or said guide, the stop/guide ensuring that the objects do not fall off the conveyor system but are conveyed onwards in the main conveying direction.

In conventional conveyor systems, it is relatively difficult to build such conveyor sections with obliquely positioned conveying rollers because it is necessary to use special conveying rollers and/or frame profiles for this purpose, which in particular differ in length from the conveying rollers used for straight fitting sections. A subsequent conversion of an existing conveyor system to obliquely positioned conveying rollers or retrofitting to straight conveying rollers is therefore difficult. At the very least, the relevant rollers and/or frame profiles have to be procured or different rollers/frame profiles have to be held in stock.

Another disadvantage of the known solutions is the fact that the pivot bearings known from the prior art cannot be used flexibly. They often have a predefined oblique position for accommodating the shaft of the conveying roller or are of a relatively fragile construction. For example, EP 1 222 125 B1 discloses an example of this, which is mounted with a plurality of pins. However, any clearance in the mountings can lead to undesired vibrations in the drive train.

Accordingly, one objective of the invention is to propose an improved conveying roller and an improved assembly thereof and an improved conveyor system. In particular, use of the relevant components should be made more flexible. This means that one and the same conveying roller should be suitable for a straight and an oblique mounting and it should also be possible to use the pivot bearing more flexibly. The latter should also provide a rigid mounting for the conveying roller where possible.

The objective of the invention is achieved by means of a conveying roller of the aforementioned type, whereby at least a first end of the shaft in the part protruding from the roller body has a first shoulder between a first section located on the roller side having a larger first cross-section and a second section lying opposite the first shoulder with a smaller second cross-section.

The objective of the invention is also achieved by means of an assembly comprising a pivot bearing and a conveying roller of the aforementioned type.

Finally, the objective of the invention is also achieved by means of a conveyor system of the aforementioned type, in which the first frame profile and second frame profile in the first conveyor section and second conveyor section are of the same type, and
the main body forms a first side wall part and a second side wall part above and below the pivot plate and extending normally to the pivot axis, which delimit the seat, and the pivot plate is mounted inside the seat on the first side wall part and second side wall part (free of clearance or with low play) and is disposed so as to be rotatable about the pivot axis relative to the stationary main body, and
the pivot bearing is mounted on the vertical web of at least the first frame profile by its main body via the releasable fixing device and is positioned relative to the first frame profile in such a way that the shaft of the motorized conveying roller extends through both one of the orifices in the vertical web and the orifice in the pivot plate.

In this manner, the conveying roller can be inserted by its first shaft end in a flexibly adjustable pivot bearing, making it possible to position the conveying roller obliquely at virtually any angle (in particular −10° to 0° and 0° to 10°), in particular steplessly. As regards the pivot bearing, this oblique position is made possible by the pivot plate. Accordingly, one and the same pivot bearing can advantageously be used to obtain different oblique positions of a conveying roller, thereby considerably simplifying stock-keeping with a view to building, converting and operating a conveyor system.

Due to the proposed features, a torque can also be effectively transmitted between the conveying roller and pivot bearing and the conveying roller is secured relatively rigidly, even if fitted in the conveyor system in an oblique position. Vibrations which can be caused or exacerbated by a motor controller for the conveying roller under certain circumstances are effectively avoided as a result or occur at least in a weakened form only.

Due to the two sections on the shaft end of the roller body, the conveying roller can also be used flexibly because the first shoulder between the first and second sections is provided for oblique fitting and the second shoulder on the first section is provided for straight fitting of the conveying roller. One and the same conveying roller can therefore advantageously be used for different fitting positions, thereby considerably simplifying stock-keeping with a view to building, converting and operating a conveyor system. In particular, the conveying roller may also have an internally lying motor for driving the roller body so that objects (e.g. containers, trays, boxes, etc.) can also be actively conveyed onwards on sections with obliquely positioned conveying rollers.

Other advantageous embodiments and features of the invention are defined in the dependent claims and the description given with reference to the drawings.

It is of advantage if the first section of the conveying roller can be inserted in a form-fitting arrangement in a first hexagonal orifice of a first frame profile and the second section is cylindrical. As a result, the conveying rollers can be inserted by their first shaft end in second frame profiles of a conveyor system having second hexagonal orifices so as to be non-rotatable. In this respect, it has proved to be of particular advantage if the hexagonal orifice(s) has/have a width across flats WAF=11 mm because this size virtually corresponds to a standard for conveyor systems.

It is of advantage if the first section of the conveying roller has a square shape or a four-armed star shape. This being the case, a good positive connection can be obtained between the first section and a first hexagonal orifice if the circumcircle/inscribed circle of the square shape or star shape is smaller than the circumcircle/inscribed circle of the first hexagonal orifice.

It is also of advantage if the second section of the conveying roller has a thread. This being the case, the conveying roller can be secured in the conveyor system by means of a nut.

It is also of advantage if in the part protruding beyond the roller body, the second end of the shaft has a third section with a hexagonal-shaped third cross-section which can be inserted in a second hexagonal orifice of a second frame profile. As a result, the conveying rollers can also be inserted in second frame profiles of a conveyor system having second hexagonal orifices by their second shaft end in a non-rotatable arrangement. In this respect, it has proved to be of particular advantage if the second hexagonal orifice has a width across flats WAF=11 mm because this size virtually corresponds to a standard for conveyor systems.

In this connection, it is of particular advantage if the third section is mounted so as to be axially displaceable relative to the first and second sections, in particular is spring mounted. This being the case, the conveying roller can firstly be inserted by the first respectively second section through a first orifice in a first frame profile of a conveyor system then through a second orifice in a second frame profile by pushing in the third section. In principle, the conveying roller can therefore be fitted in a conveyor system and dismantled again without tools. Naturally, this conveying roller may be additionally secured by means of screws, for example.

It is also of particular advantage if the conveying roller comprises, disposed adjacent to the first section on the roller side, a fourth section with a circular cross-section which is smaller than the circumcircle of said hexagon. This being the case, the cylindrical section of the roller shaft lying substantially in the interior of the roller body can be disposed on a roller bearing, a stator of an electric motor, a bush and similar and can be kept relatively slim. The amount of material removed when producing the first to the third sections starting from a rod material is therefore low. Machining time is therefore short and the service life of the machining tools long. It has proved to be of particular advantage in this connection if the fourth section has a diameter of 12 mm.

It is also of advantage if the assembly incorporating a conveying roller proposed by the invention and a pivot bearing comprises two frame profiles extending at a distance apart from one another and a first orifice in a first frame profile co-operates with the first section of the conveying roller and a second orifice in the second frame profile co-operates with the third section of the conveying roller. Based on this variant, the conveying roller can also be inserted between two frame profiles of a conveyor system, in particular with a non-rotatable or fixed shaft.

In this respect, it is of advantage if the first orifice and/or the second orifice is hexagonal-shaped. This being the case, conveying rollers with a hexagonal-shaped shaft end can be inserted respectively by one shaft end which can be inserted in at least one hexagonal orifice. It has also proved to be of particular advantage if the hexagonal orifice has a width across flats WAF=11 mm because this size virtually corresponds to a standard for conveyor systems.

It is of particular advantage if
 the first frame profile has several first orifices spaced apart from one another in its longitudinal direction and the second frame profile has several second orifices spaced apart from one another in its longitudinal direction,
 each first orifice lies directly opposite a second orifice in each case,
 the distance between the first and second frame profile is dimensioned such that the first section and the third section of the shafts sit in first and second orifices of the frame profiles lying directly opposite one another when the conveying roller is mounted in a straight position and
 the lengthways distance of the first respectively second orifices is dimensioned such that when the conveying roller is mounted in an oblique position, the first section of the shaft sits in a first orifice of the first frame profile, the second section of the shaft sits in the cylindrical orifice of the pivot bearing mounted in the first orifice on the outside of the first frame profile, in particular in the pivot plate of a pivot bearing, and the third section of the shaft sits in one of the first orifices lying obliquely opposite the second orifice in the second frame profile.

Based on this embodiment, therefore, the length of the conveying roller respectively the distances between the first and third and between the second and third sections are adapted to the spacing of the two frame profiles and the spacing of the orifices provided in them. The conveying roller can therefore be mounted in a straight position between the frame profiles as well as in an oblique position between them. If the conveying roller is mounted in a straight position, the first and third sections of the conveying roller sit in the orifices of the frame profiles, and the second section protrudes accordingly out beyond the first frame profile. If it is provided with a thread, the conveying roller can therefore be screwed to the first frame profile, for example. A special nut may be used for this purpose, which enables the first section of the conveying roller to protrude from the frame profile. To this end, the nut has a cavity (e.g. cylindrical bore) facing the frame profile in which the first section is accommodated. The cavity may therefore be a cylindrical orifice disposed upstream of the thread of the nut.

In particular, if the difference in the cross-sections of the first and fourth sections of the conveying roller is only slight and the first shoulder or collar between these two sections is therefore only very small, a washer may also be provided between this first shoulder/collar and the frame profile. It preferably has a relatively large surface area and is made from steel. This prevents tearing out of the orifice in the frame profile, which is usually made from aluminum.

If the conveying roller is mounted in an oblique position, the second section of the conveying roller is inserted in a co-operating orifice in the pivot bearing, which is mounted on the outside of the first frame profile in the region of a first orifice. The first and second orifices used then no longer lie directly opposite one another and instead are obliquely offset from one another. The fact that the second section of the conveying roller used for an oblique mounting in the pivot bearing lies farther towards the outside than the first section of the conveying roller enables the compensation in length necessary for an oblique mounting to be effectively achieved. A compensation in length can also be achieved or assisted in the case of an oblique mounting of the conveying roller, in particular a motorized conveying roller, due to the fact that the third section is mounted so as to be displaceable and in particular is spring-mounted and/or by dispensing with a washer used for a straight mounting. To enable an oblique mounting of the conveying roller and to prevent jamming of the connection between the conveying roller and frame profiles, a sufficient clearance should be provided between the orifices in the frame profiles and the first and third sections of the conveying roller.

In terms of the conveyor system, it is of advantage if
  the guide surfaces extending normally with respect to the pivot axis co-operate with guide surfaces in the main body likewise extending normally with respect to the pivot and
  a torque acting on the pivot plate around the axis of the conveying roller is absorbed by the abutting guide surfaces of the pivot plate and the guide surfaces of the main body.

The guide surfaces of the pivot plate are in contact with the guide surfaces of the main body in in the no-load state already, i.e. without applying a torque to the pivot plate. A torque between the conveying roller and pivot bearing is therefore transmitted via the guide surfaces of the pivot plate and the guide surfaces of the main body. The bearing of the conveying roller is therefore particularly rigid. Vibrations which might be caused or exacerbated due to a motor controller of the conveying roller can therefore be more effectively prevented or do occur but only in a very much weakened form. Due to the proposed features, the pivot bearing of the pivot plate may also be of a relatively "fragile" (thin-walled) design, which means that the pivot bearing as a whole is of a relatively more compact design without any detriment to stability. The pivot bearing in this instance may also have some mounting clearance and is therefore easy to manufacture.

In terms of the conveyor system, it is of advantage if
  the pivot plate has at least one cylindrical pivot pin protruding normally out from the guide surface and
  the main body is of a multi-part design, and a first bearing providing a seat for said pivot pin is disposed in a first part or a first half-shell is provided in a first part and a second half-shell is provided in a second part for seating said pivot pin.

This makes for a relatively compact design of the pivot bearing. The parts of the main body merely have to be assembled. The pivot pin also serves as an effective pivot bearing for the pivot plate. Naturally, the seat of the pivot pin need not necessarily be in the form of two half-shells and any other type of (bearing) seat may be used.

If a dividing plane of the main body through the bearing bore for seating said pivot pin is such that a half-shell is created in each of the parts, the pivot pin and half-shells may be designed/dimensioned so that the pivot plate can be mounted and retained via the pivot pin/half-shell assembly "free of clearance" in the main body. In this instance, a torque acting on the pivot plate around the axis of the orifice can be absorbed by the pivot pin/half-shell assembly. If during operation of the conveyor system, signs of wear start to occur on the pivot pin/half-shell assembly, however, it would also be possible for a torque acting on the pivot plate around the axis of the orifice to be absorbed by the guide surfaces of the pivot plate and guide surfaces of the main body in the case of this embodiment.

It is of particular advantage if the pivot plate has two pivot pins of said type which are mounted in two bearings or respectively in two half-shells. This enables the pivot plate to be mounted so that it rotates more effectively.

It is of advantage if the pivot plate is of a substantially square shape. This being the case, the pivot plate is easy to produce insofar as it can be cut to length from flat material and provided with an orifice for the shaft end of a conveying roller and optionally with at least one pivot pin respectively at least one bore for a pivot pin The pivot pins may be inserted in in bores in the pivot plate, for example.

Figure 2:
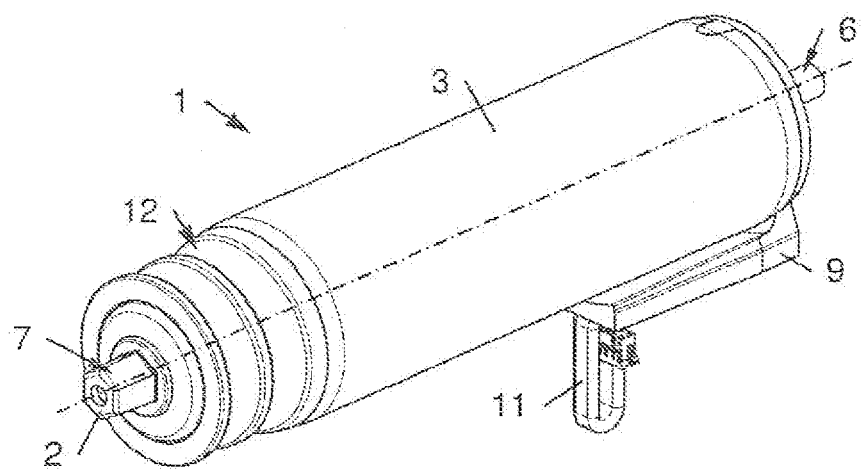
Figure 3:
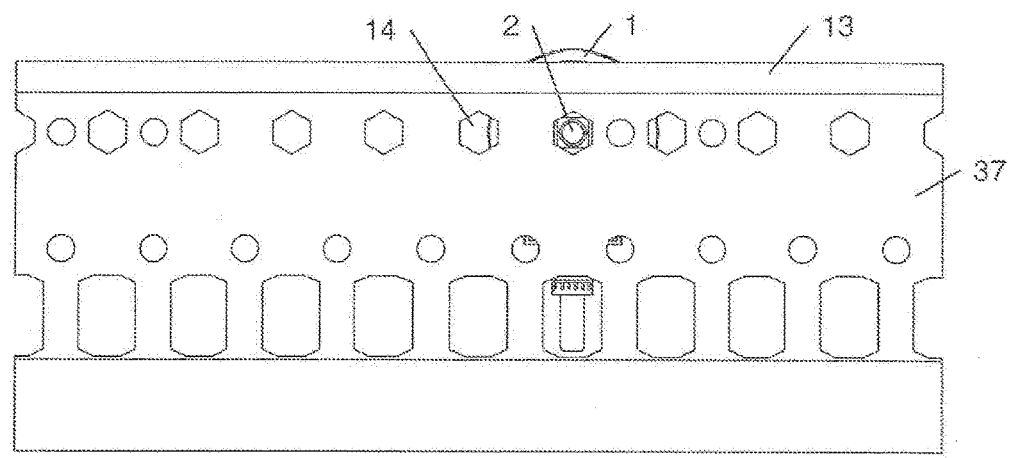
Figure 4:
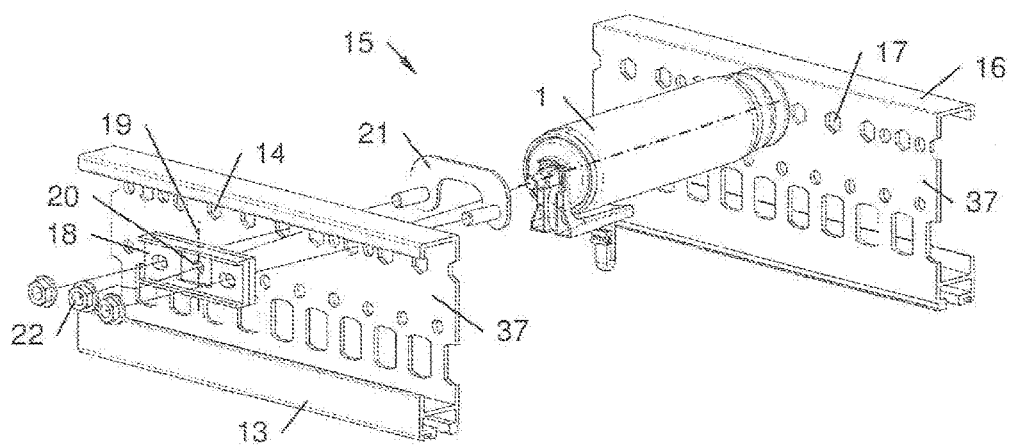
Figure 5:
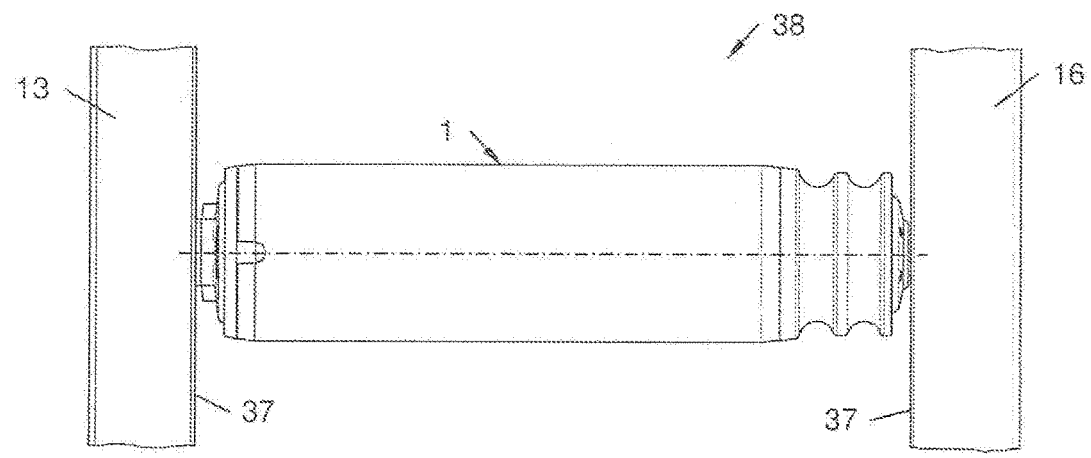
Figure 6:
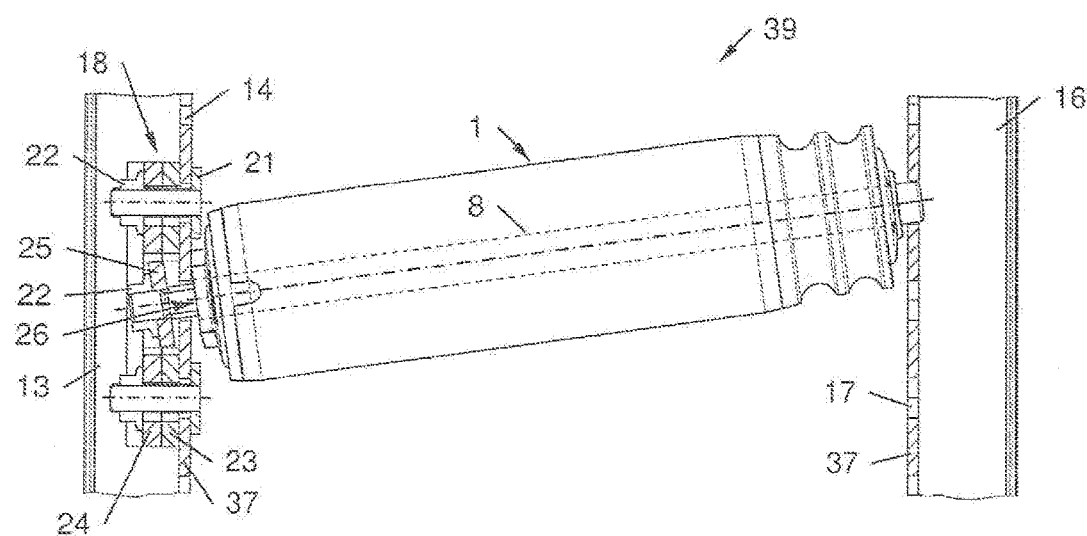
Figure 7:
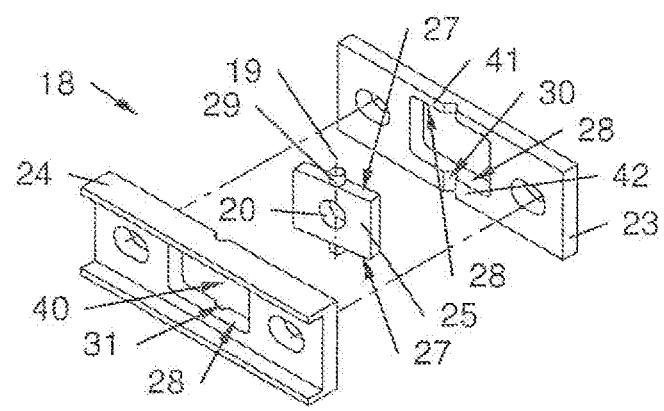
Figure 8:
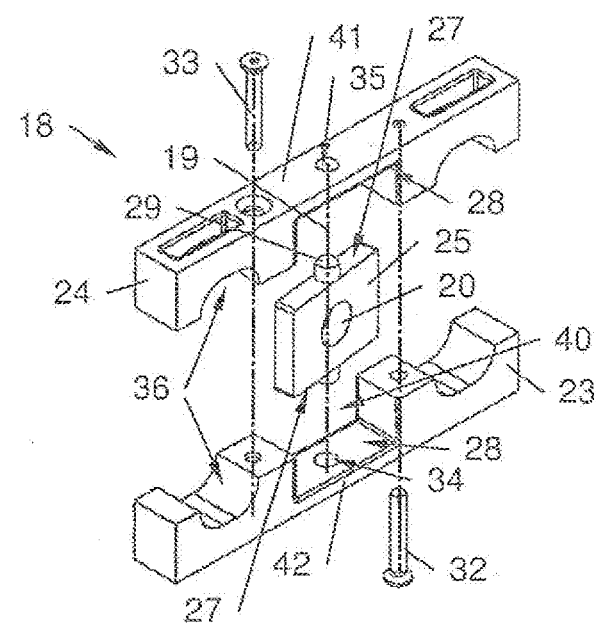
Figure 9:
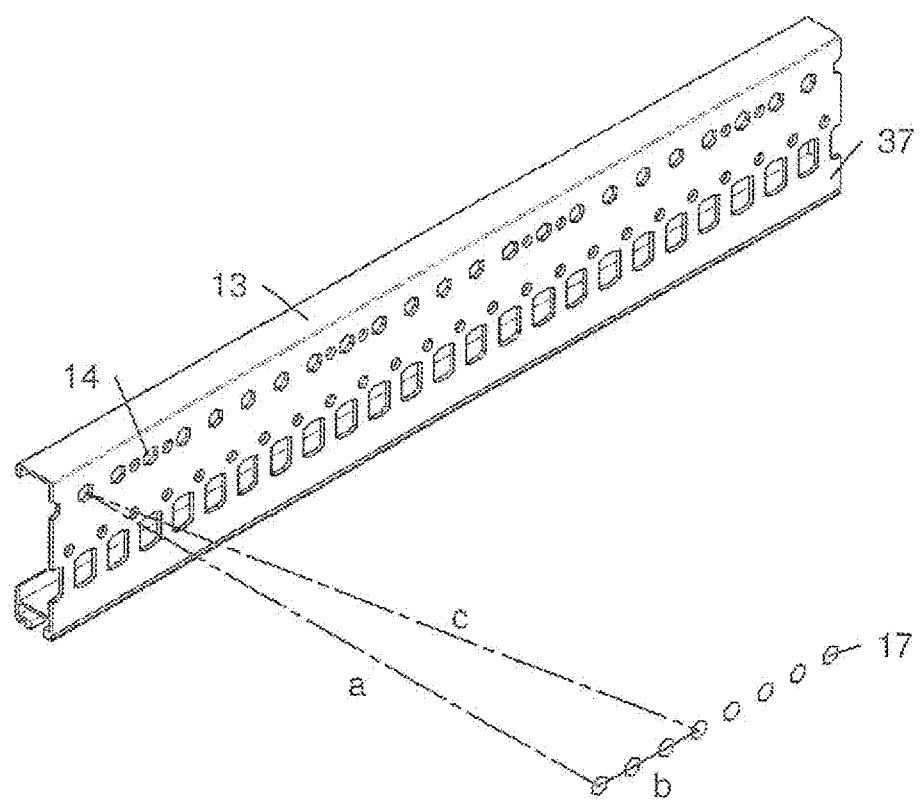

To provide a clearer understanding, the invention will be described in more detail below with reference to the drawings. Of these
  FIG. 1 shows an example of a conveying roller viewed from the front;
  FIG. 2 shows the conveying roller from FIG. 1 viewed at an angle from behind;
  FIG. 3 is a side view of a conveying roller fitted in a frame profile;
  FIG. 4 is an exploded diagram of a conveying roller fitted between two frame profiles with the aid of a pivot bearing;
  FIG. 5 is a plan view of a first detail of a conveyor system with a conveying roller fitted in a straight position between two frame profiles;
  FIG. 6 is a plan view of a second detail of the conveyor system with a conveying roller fitted in an oblique position between two frame profiles with the aid of a pivot bearing;
  FIG. 7 is an exploded diagram illustrating an example of a pivot bearing;
  FIG. 8 is an exploded diagram illustrating another example of a pivot bearing and
  FIG. 9 is a schematic diagram illustrating the differences in length in the case of a straight and an oblique mounting of the conveying roller.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIGS. 1 and 2 illustrate an example of a cylindrical conveying roller 1 for conveying objects, viewed at an angle (FIG. 1 from the front, FIG. 2 from behind). The conveying roller 1 comprises a fixed shaft 2 and a roller body 3 mounted so as to be rotatable about this shaft 2. In the part projecting out from the roller body 3, a first end of the shaft 2 has a first shoulder 4 between a first section located on the roller side 5 having a larger first cross-section and a second section 6 lying opposite having a smaller second cross-section.

The second end of the shaft 2 in this example has a third section 7 with a hexagonal-shaped third cross-section in the part projecting out from the roller body 3. In FIG. 1, a fourth section 8 is indicated by broken lines, which is disposed adjacent to the first section 5 and in this example also adjacent to the third section 7. The fourth section 8 substantially constitutes the part of the shaft 2 extending inside the roller body 3. Generally speaking, the shaft 2 may be continuous as illustrated in FIG. 1 or alternatively split.

The conveying roller 1 illustrated in FIGS. 1 and 2 also comprises a protective cap 9, through which a connecting cable 11 is run, which is connected to a motor (not illustrated) inside the roller body 3. Also illustrated in FIG. 1 is a washer 10. Finally, the drawings also illustrate grooves 12 in the roller body 3 in which a driving belt can be received in order to transmit the driving force from a motor-driven conveying roller 1 to non-motorized conveying rollers.

FIG. 3 is a side view illustrating a frame profile 13 of a conveyor system for conveying objects with a mounted conveying roller 1. The first section 5 of the conveying roller 1 is inserted in a form-fitting arrangement in a first hexagonal orifice 14 in a vertical web 37 of the first frame profile 13. Specifically, the first section 5 is of a square shape. An alternative shape would be a star shape with four arms, for example. Based on the selected shape, the conveying rollers 1 can be inserted in the frame profile 13 by their first shaft end so as to be non-rotatable. It has proved to be of particular advantage if the first hexagonal orifice 14 is provided with a width across flats WAF=11 mm because this size virtually corresponds to a standard for conveyor systems.

Another advantage of a square shape is that the circumcircle/inscribed circle of a square shape (respectively four-armed star shape) is smaller than the circumcircle/inscribed circle of the first hexagonal orifice 14. The first section 5 of the shaft 2 may therefore be of a relatively slim design. In particular, the conveying roller 1 has a fourth section 8 with a circular cross-section which is smaller than the circumcircle of said hexagon. As a result, the cylindrical, fourth section 8 of the roller shaft 2 predominantly extending through the interior of the roller body 3 can be disposed on the roller bearing, a stator of an electric motor, bushes and similar, for example, and can be kept relatively slim. The amount of material removed when producing the first to the third sections 5, 6, 7 starting from a rod material is therefore low. Machining time is therefore short and the service life of the machining tools long. It has proved to be of particular advantage in this connection if the fourth section 8 has a diameter of 12 mm.

The third section 7 of the conveying roller 1 in this example has a hexagonal-shaped third cross-section, as mentioned above, which can be fitted in a form-fitting arrangement in a second hexagonal orifice 17 of a second frame profile 16. It has also proved to be of particular advantage if the second hexagonal orifice for the third section 7 likewise has a width across flats WAF=11 mm.

FIG. 4 is an exploded diagram illustrating an assembly 15 having two frame profiles 13 and 16 extending at a distance apart and a conveying roller 1 inserted in between them. To this end, the first frame profile 13 has first orifices 14 and the second frame profile 16 has second orifices 17. The first and second orifices 14, 17 are provided in the vertical web 37 of the frame profiles 13, 16. The assembly 15 further comprises a pivot bearing 18, which has a generally cylindrical orifice 20 around the pivot axis 19 of the pivot bearing 18 oriented normally thereto and which can be pivoted, which co-operates with the second section 6 of the conveying roller 1. In other words, the conveying roller 1 can be inserted through the orifice 20 of the pivot bearing 18 by the second section 6 of the shaft 2. The second section 6 of the conveying roller 1 in this example is cylindrical and has an optional thread. As a result, the conveying roller 1 can be screwed to the pivot bearing 18 by means of a nut 22. The pivot bearing 18 itself is secured to the external face of the first frame profile 13 on the web 37, in particular by means of a back-plate 21 and nuts 22.

Based on one advantageous embodiment of the conveying roller 1, the third section 7 of the conveying roller 1 is axially displaceable relative to the first and second sections 5, 6, in particular is spring-mounted. This being the case, the conveying roller 1 can firstly be inserted by the first section 5 respectively second section 6 through the first orifice 14 in the first frame profile 13 and then through the second orifice 17 in the second frame profile 16 by pushing in the third section 7 (or vice versa). In principle, the conveying roller 1 can therefore be fitted in a conveyor system and dismantled again without tools. Naturally, this conveying roller 1 may additionally be secured by means of a nut 22, as illustrated in FIG. 4. The positive connection between the first section 5 and the first orifice 14 respectively between the third section 7 and the second orifice 17 is therefore very practical because there is no need for counter-support when tightening the nut 22.

The conveying roller 1 is mounted by its first shaft end via the flexibly adjustable pivot bearing 18 on the first frame profile 13 and by its second shaft end directly in the second frame profile 16 in such a way that virtually all oblique positions (in particular −10° to 0° and 0° to 10°) of the conveying roller 1 can be obtained.

The conveying roller 1 may naturally also be fitted straight with the aid of the pivot bearing 18. In this case, the washer 10 can be dispensed with. For straight mounting, however, the first section 5 is preferably inserted in the first orifice 14 and the third section 7 in the second orifice 17 without a pivot bearing 18 being used.

To this end, FIG. 5 is a plan view illustrating a first conveyor section 38 of a conveyor system in which one or more conveying roller(s) 1 is or are mounted straight between two frame profiles 13 and 16.

FIG. 6 also illustrates a second conveyor section 39 of a conveyor system in a horizontal section, where at least one conveying roller 1 is mounted with the aid of the pivot bearing 18 in an oblique position between two frame profiles 13 and 16. As may also be seen from FIG. 6, the second section 6 co-operates with the orifice 20 in the pivot plate 25 of the pivot bearing 18. In particular, the first shoulder 4 lies on the right-hand side of the pivot plate 25 and is tightened against it with the aid of the nut 22. In FIG. 6, the left-hand end face of the conveying roller 1 respectively the protective cap 9 lies on the first frame profile 13 due to the pronounced oblique position. In principle, however, there may also be air between the conveying roller 1 and the first frame profile 13, especially if the oblique position is less pronounced. In FIG. 6, finally, the second shoulder 26 between the first section 5 and the fourth section 8 of the shaft 2 may also be seen.

FIG. 7 is an exploded diagram illustrating the pivot bearing 18 used in in FIG. 6 but in this instance on its own. The pivot bearing 18 comprises a main body which comprises two parts 23, 24 in this example and a pivot plate 25 (in this instance of a substantially square shape), which is mounted in the main body respectively in a seat 40 thereof so as to be rotatable about a pivot axis 19. The pivot plate 25 has a generally cylindrical orifice 20 oriented normally with respect to said pivot axis 19 and normally with respect to the pivot axis 19 of stationary guide surfaces 27. The guide surfaces 27 therefore also co-operate with stationary guide surfaces 28 in the main body 23, 24 likewise disposed normally with respect to the pivot axis 19, which are delimited by a first side wall part 41 and a second side wall part 42.

In this example, the pivot plate 25 comprises cylindrical pivot pins 29 extending respectively coaxially with the pivot axis 19 protruding from the guide surfaces 27, mounted in the multi-part main body 23, 24. To this end, two first half-shells 30 are provided in the first part 23 and two second half-shells 31 are provided in the second part 24 to provide a seat for said pivot pins 29. This results in a relatively compact design of the pivot bearing 18, which can be built by simply assembling the two parts 23, 24.

If, in structural terms, a clearance (albeit only slight) is provided between guide surfaces 27 and guide surfaces 28, a torque of the pivot pin 29 respectively its bearings 30, 31 acting on the pivot plate 25 around the axis of the orifice 20 is absorbed, as is the case in the embodiment illustrated in FIG. 7. To this end, pivot pins 29 are mounted "clearance-free" in the half-shells 30, 31. This can be achieved in particular due to the fact that the half-shells 30, 31 are less deep than the diameter of the pivot pin 29. When the parts 23, 24 are joined to one another, for example by a releasable connecting device such as the back-plate 21 and nuts 22, the pivot plate 25 is held/mounted via the pivot pin 29 in the half-shells 30, 31 between parts 23, 24 "clearance free" (and thus without a clearance) and the pivot pin 29 is lightly clamped between the parts 23, 24.

FIG. 8 illustrates an alternative embodiment of a pivot bearing 18, which is similar to the pivot bearing 18 illustrated in FIG. 7. However, the plane between the parts 23 and 24 extends in a different way. This being the case, two separate screws 32, 33 are used to assemble the pivot bearing 18, whereas the pivot bearing 18 in FIG. 7 can be assembled solely with the aid of the back-plate 21 and nuts 22. The pivot bearing 18 of FIG. 8 can therefore advantageously be assembled prior to mounting it on/in the frame profile 13. Due to the fact that the plane of the parts for the pivot pin 29 extends differently, bearing seats 34, 35 are provided instead of half-shells 30, 31, each being completely contained in one of the parts 23, 24 of the main body. For the same reason, half-shells 36 are then also provided for the back-plate 21.

A torque acting on the pivot plate 25 around the axis of the conveying roller 1 is advantageously absorbed by the abutting guide surfaces 27 of the pivot plate 25 and the guide surfaces 28 of the main body 23, 24.

The guide surfaces 27 of the pivot plate 25 are in contact with the guide surfaces 28 of the main body 23, 24 in the no-load state already in this instance, i.e. without applying a torque to the pivot plate 25. This can be achieved, for example, due to the fact that the pivot plate 25 fits in the seat 40 provided for it in the main body 23, 24 without any clearance (FIG. 7) or the groove-type seating sections provided in parts 23, 24 for the pivot plate 25 in total are less deep than the height of the pivot plate 25. This being the case, the guide surfaces 27 of the pivot plate 25 and the guide surfaces 28 of the main body 23, 24 are pressed against one another when the screws 32, 33 are tightened (see FIG. 8). Naturally, however, a clearance may also be provided between guide surfaces 27 and guide surfaces 28 in the case of the pivot bearing 18 illustrated in FIG. 8.

If, in structural terms, a clearance (albeit only slight) is provided between the pivot pins 29 and bearings 34, 35 a torque acting on the pivot plate 25 around the axis of the orifice 20 is absorbed by the abutting guide surfaces 27 of the pivot plate 25 and the guide surfaces 28 of the main body 23, 24, as may be the case with the embodiment illustrated in FIG. 8. To this end, the pivot pins 29 are mounted in the bearing seats 34, 35 in a "low play" arrangement (hence with a slight clearance). This can be achieved in particular due to the fact that the bearing seats 34, 35 are bigger (albeit only slightly) than the diameter of the pivot pins 29. When the parts 23, 24 are connected to one another, for example by a releasable connection such as the screws 32, 33, the pivot plate 25 is held via the guide surfaces 27 between the parts 23, 24 "clearance free" (hence without a clearance) and the pivot plate 25 is lightly clamped.

Due to the "clearance free" bearing/retention of the pivot plate 25 in the main body 23, 24 and in a plane perpendicular to the axis of orifice 20, the pivot plate 25 will not turn relative to the main body 23, 24 in the plane perpendicular to the axis of orifice 20 even if a torque is acting around the axis of orifice 20 transmitted by the motorized or driven conveying roller 1.

The torque is generally transmitted relatively rigidly if transmitted via the relatively large guide surfaces 27, 28. Vibrations, which might be caused or exacerbated, for example in the case of too soft a bearing of the conveying roller 1, due to a motor controller for the drive motor of the conveying roller 1 do not occur at all or do so but at least in only a weakened form.

The two parts 23, 24 of the main body and/or the pivot plate 25 may generally be made from a metal material, for example steel, aluminum, or from a sintered material. Similarly, it would also be conceivable for the two parts 23, 24 of the main body and/or the pivot plate 25 to be made from plastic, in particular a fiber-reinforced plastic. In particular, the pivot plate 25 may be made from steel and the main body 23, 24 from plastic. Especially in this case, it may be that the bearing plate between the pivot pin(s) 29 and half-shells 30, 31 respectively the bearings 34, 35 becomes larger over the course of time and a torque around the axis of the conveying roller 1 may ultimately be transmitted via guide surfaces 27 and 28 even if the bearing of the pivot pins 29 was initially clearance free/low play.

In the illustrated examples, the pivot plates 25 respectively have two pivot pins 29. It would naturally also be possible for a pivot plate 25 to have only one pivot pin, in which case it may optionally be of a longer design in order to guarantee a more reliable bearing for the pivot plate 25 in the main body 23, 24.

Also, the main body 23, 24 need not be based on a multi-part design and instead could also be made as a single part. In this case, instead of the pivot pin 29, separate bolts could be inserted laterally through bores of the main body through to bores of the pivot plate 25 which are oriented along the pivot axis 19, for example.

As may be seen from FIGS. 4, 6 and 8, the first frame profile 13 has several first orifices 14 spaced apart from one another in its longitudinal direction and the second frame profile 16 has several second orifices 17 spaced apart from one another in its longitudinal direction, disposed in the webs 37, each first orifice 14 lying directly opposite a second orifice 17 in each case. FIG. 8 is a simplified diagram illustrating this, only a few second orifices 17 of the second frame profile 16 being shown. The assembly 15 advantageously fulfils the following criteria:

the distance "a" between the first and second frame profiles 13, 16 is dimensioned such that the first section 5 and the third section 7 of the shaft 2 sit in first and second orifices 14, 17 of the frame profiles 13, 16 lying directly opposite one another when the conveying roller 1 is mounted in a straight position (and the second section 6 projects accordingly out beyond the first frame profile 13) and the lengthways distance "b" of the first respectively second orifices 14, 17 is dimensioned such that when the conveying roller 1 is mounted in an oblique position, the first section 5 of the shaft 2 sits in a first orifice 14 of the first frame profile 13, the second section 6 of the shaft 2 sits in the cylindrical orifice 20 of the pivot bearing 18, in particular in the pivot plate 25 of the pivot bearing 18, mounted in the first orifice 14 on the outside of the first frame profile 13, and the third section 7 of the shaft 2 sits in one on the first orifices 14 lying obliquely opposite the second orifice 17 in the second frame profile 16.

In other words, the first shoulder 4 between the first section 5 and second section 6 is used for an oblique mounting of the conveying roller 1 in that it is moved into abutment with the pivot plate 25. In the case of a straight mounting of the conveying roller 1, on the other hand, the second shoulder 26 between the first section 5 and fourth section 8 is moved into abutment with the first frame profile 13, in particular using the washer 10.

One and the same conveying roller 1 can therefore be mounted in a straight position between the frame profiles 13, 16 and in an oblique position between them. The compensation in terms of length needed for an oblique mounting (compare lengths "a" and "c" in FIG. 8) can be achieved due to the fact that said shoulders 4, 26 on the shaft 2 are spaced apart from one another in the axial direction of the conveying roller 1 and due to the fact that the second section 6 of the conveying roller 1 lies farther towards the outside than the first section 5. This can also be achieved or aided due to the fact that the third section 7 is mounted so as to be displaceable and in particular is spring-mounted and/or by dispensing with the washer 10 in the case of a straight mounting. However, the distance "a" between the frame profiles 13 and 16 and/or the lengthways distance of orifices 14 and 17 in the frame profiles 13 and 16 may remain unchanged. Furthermore, there is no need for a special process to produce specific frame profiles such as those disclosed in EP 1 222 125 B1, for example, as a result of the design proposed by the invention.

With the aid of the thread provided in the second section 6 and a nut 22, the conveying roller 1 can be screwed to the first frame profile 13. For this purpose, a special washer 10 (preferably made from steel) may be provided on the second shoulder 26 between the first section 5 and the fourth section 8 so that the axial forces are reliably transmitted and to prevent tearing out from the first orifice 14 in the first frame profile 13, usually made from aluminum.

As may be seen from FIGS. 4 and 6, a special nut 22 is used in the example illustrated, which enables the first section 5 of the conveying roller 1, which does not necessarily have a thread, to protrude out from the first frame profile 13. For this purpose, the nut 22 has a cavity facing the first flame profile 13 in which the first section 5 is accommodated. The cavity may be a cylindrical bore upstream of the thread of the nut 22, for example. The bore diameter is bigger than the thread diameter.

To enable an oblique mounting of the conveying roller 1 and to prevent jamming of the connection between the conveying roller 1 and frame profiles 13, 16, a sufficient clearance should generally be provided between the orifices 14, 17 in the frame profiles 13, 16 and the first and third section 5, 7 of the conveying roller 1. To prevent the conveying roller 1 wobbling in spite of said clearance, the third section 7 may also be of a conical design. As a result, both in the case of a straight mounting of the conveying roller 1 and an oblique mounting thereof, a clearance free/low play seating of the third section 7 in the second orifice 17 is obtained, especially if the third section 7 is spring-mounted and displaceable. These features are of particular advantage if the conveying roller 1 is not screwed to the second frame profile 16. Furthermore, a clearance free/low play seating at the third section 7 helps to prevent the occurrence of vibrations as described above.

In other words, what is proposed is a conveyor system for conveying objects, in particular loading aids such as containers, trays, by means of conveying rollers 1 in several conveyor sections 38, 39, comprising a first frame profile 13, a second frame profile 16, which first and second frame profiles 13, 16 extend parallel at a mutual distance "a" apart from one another in the conveying direction of the objects, each having a vertical web 37 with orifices 14, 17 disposed one after the other in the conveying direction to provide a seat for a shaft 2 of the conveying rollers 1, a first conveyor section 38 in which the conveying rollers 1 are disposed between the first and second frame profile 13, 16 with their shafts 2 substantially normally with respect to the web 37, a second conveyor section 39 in which the conveying rollers 1 are disposed between the first and second frame profiles 13, 16 with their shafts 2 disposed at an angle to the web 37, at least one motorized conveying roller 1 in the second conveyor section 39, at least one pivot bearing 18 in the second conveyor section 39 which provides a mount for the motorized conveying roller 1 at one end by means of its shaft 2, comprising a single-part or multi-part main body 23, 24 and a pivot plate 25 which is mounted on the main body 23, 24 in a seat 40 so as to be rotatable about a pivot axis 19, and which comprises an orifice 20 oriented normally with respect to said pivot axis 19 and which has guide surfaces 27 extending normally with respect to the pivot axis 19, and the pivot bearing 18 is mounted on the frame profile 13 respectively its web 37 by means of its main body 23, 24 via a releasable fixing device 22, and the first frame profile 13 and second frame profile 16 in the first conveyor section 38 and second conveyor section 39 are of identical design, and the main body 23, 24 forms a (top) first side wall part 41 and a (bottom) second side wall part 42 extending above and below the pivot plate 25 and normally with respect to the pivot axis 19 which delimit the seat 40, and the pivot plate 25 is mounted inside the seat 40 on the (top) first side wall part 41 and (bottom) second side wall part 42 without clearance or with a low play and is disposed so as to be rotatable relative to the stationary main body 23, 24 about the pivot axis 19, and the pivot bearing 18 is mounted by its main body 23, 24 on the vertical web 37 of at least the first frame profile 13 via the releasable fixing device 22 and is positioned in such a way relative to the first frame profile 13 that the shaft 2 of the motorized conveying roller 1 extends through both one of the orifices 14 in the vertical web 37 and the orifice 20 in the pivot plate 25.

The first conveyor section 38 (parts of which are illustrated in FIG. 5) usually comprises several conveying rollers 1. One or some of the conveying rollers 1 is or are motorized conveying rollers 1. The other ones of the conveying rollers 1 are non-driven conveying rollers 1 or are conveying rollers 1 that are driven by the motorized conveying rollers 1. However, another embodiment would be possible in which all of the conveying rollers are non-driven.

The second conveyor section 39 (parts of which are illustrated in FIG. 6) usually comprises several conveying rollers 1 and likewise one or some of the conveying rollers 1 is or are motorized and the other ones of the conveying rollers 1 are non-driven (freely rotating conveying rollers) or are driven by the motorized conveying rollers 1. These conveying rollers 1 are each retained on the first frame profile 13 by one of their shaft ends by means of the described pivot bearing 18.

The embodiments illustrated as examples represent possible variants of the conveying roller 1 proposed by the invention and a conveyor system proposed by the invention, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention. In particular, the conveyor system is not restricted to the use of a conveying roller 1 of the type proposed by the invention, in which case any other conveying roller may be used in the conveyor system proposed by the invention.

In particular, it should be pointed out that a conveying roller 1, a pivot bearing 18 and a conveyor system may in reality also comprise more or fewer components than those described here.

For the sake of good order, finally, it should be pointed out that, in order to provide a clearer understanding of the structure of the conveying roller 1, pivot bearing 18 and conveyor system, they and their constituent parts are illustrated to a certain extent out of scale and/or on an enlarged scale and/or on a reduced scale.

The objective underlying the independent inventive solutions may be found in the description.

| | List of reference numbers |
|---|---|
| 1 | Conveying roller |
| 2 | Shaft |
| 3 | Roller body |
| 4 | First shoulder |
| 5 | First section of the shaft |
| 6 | Second section of the shaft |
| 7 | Third section of the shaft |
| 8 | Fourth section of the shaft |
| 9 | Cap |
| 10 | Washer |
| 11 | Connecting cable |
| 12 | Groove |
| 13 | First frame profile |
| 14 | First orifice |
| 15 | Assembly |
| 16 | Second frame profile |
| 17 | Second orifice |
| 18 | Pivot bearing |
| 19 | Pivot axis |
| 20 | Cylindrical orifice |
| 21 | Back-plate |
| 22 | Nut |
| 23 | First part of the main body |
| 24 | Second part of the main body |
| 25 | Pivot plate |
| 26 | Second shoulder |
| 27 | Guide surface of pivot plate |
| 28 | Guide surface of main body |
| 29 | Pivot pin |
| 30 | Half-shell for pivot pin |
| 31 | Half-shell for pivot pin |
| 32 | Screw |
| 33 | Screw |
| 34 | Bearing |
| 35 | Bearing |
| 36 | Half-shell |
| 37 | Vertical web |
| 38 | First conveyor section |
| 39 | Second conveyor section |
| 40 | Seat for pivot plate |
| 41 | First side wall part |
| 42 | Second side wall part |
| a | Transverse distance of directly opposite orifices |
| b | Lengthways distance od consecutive orifices |
| c | Transverse distance of obliquely opposite orifices |

The invention claimed is:
1. Assembly comprising
a first frame profile having several first orifices spaced apart from one another in a longitudinal direction of the first frame profile,
a second frame profile having several second orifices spaced apart from one another in a longitudinal direction of the second frame profile,
a conveying roller and
a pivot bearing,
the first frame profile and second frame profile extend at a distance, and
a second orifice lies directly opposite every first orifice respectively, and
a first orifice of the first frame profile co-operates with a first section on a first end of the conveying roller and a second orifice of the second frame profile co-operates with a third section on a second end of the conveying roller, and
the conveying roller comprises a shaft and a roller body mounted so as to be rotatable about the shaft, and, on the first end of the conveying roller, at least a first end of the shaft in a part of the shaft protruding beyond the roller body has a first shoulder between the first section located on the roller side having a first cross-section and a second section lying opposite the first shoulder having a second cross-section smaller than the first cross-section, wherein the pivot bearing has a pivot axis and a generally cylindrical orifice that is pivotable about the pivot axis of the pivot bearing and oriented normally with respect thereto which co-operates with the second section, the distance between the first and second frame profile is dimensioned such that the first section and the third section lie in directly opposite first and second orifices of the frame profiles when the conveying roller is mounted in a straight position and the lengthways distance of the first or second orifices is dimensioned such that when the conveying roller is mounted in an oblique position, the first section sits in a first orifice of the first frame profile, the second section sits in the cylindrical orifice of the pivot bearing and the third section sits in one of the second orifices lying obliquely opposite the first orifice.

2. Assembly according to claim 1, wherein the first orifice is hexagonal and the first section can be inserted in a positively fitting arrangement in the hexagonal orifice of the first frame profile and the second section is cylindrical in shape.

3. Assembly according to claim 2, wherein the first section has a square shape or a four-armed star shape.

4. Assembly according to claim 1, wherein the second section has a thread.

5. Assembly according to claim 1, wherein the second orifice is hexagonal and the third section can be inserted in a positively fitting arrangement in the second hexagonal orifice of the second frame profile.

6. Assembly according to claim 5, wherein the hexagon has a width across flats WAF=11 mm.

7. Assembly according to claim 1, wherein the third section is mounted so as to be axially displaceable relative to the first and second sections.

8. Assembly according to claim 1, wherein a fourth section between the first and second ends of the conveying roller having a circular fourth cross-section that is smaller than the circumcircle of said hexagon is provided adjacent to the first section on the roller side.

9. Assembly according to claim 8, wherein the fourth cross-section has a diameter of 12 mm.

10. Conveyor system for conveying objects, via conveying rollers in several conveyor sections, each conveying roller having a respective shaft, comprising a first frame profile, comprising a vertical web having first orifices disposed in the vertical web one after the other in the conveying direction to provide respective seats for the respective shafts of the conveying rollers, a second frame profile comprising a vertical web having second orifices disposed in the vertical web one after the other in the conveying direction to provide respective seats for the respective shafts of the conveying rollers, the first frame profile and second frame profile extend parallel with one another at a mutual distance apart and in the conveying direction of the objects, a first conveyor section in which the conveying rollers are disposed between the first and second frame profiles with respective shafts of the respective conveying rollers substantially normally with respect to the web, at least one of the conveying rollers in the first conveyor section being a motorized conveying roller, a second conveyor section in which the conveying rollers are disposed between the first and second frame profiles with respective shafts of the respective conveying rollers at an angle to the web, at least one of the conveying rollers in the second conveyor section being a motorized conveying roller, and the first frame profile and second frame profile in the first conveyor section and second conveyor section are of identical design, and a first orifice of the first frame profile co-operates with a first section on a first end of the motorized conveying roller and a second orifice of the second frame profile co-operates with a third section on a second end of the motorized conveying roller, and both the motorized conveying roller in the first conveyor section and the motorized conveying roller in the second conveyor section respectively comprise a shaft and a roller body mounted so as to be rotatable about this shaft, and, on the first end of the motorized conveying roller, at least a first end of the shaft in the part protruding beyond the roller body has a first shoulder between the first section located on the roller side having a first cross-section and a second section lying opposite the first shoulder having a second cross-section smaller than the first cross-section, at least one pivot bearing in the second conveyor section which provides a mount for the shaft on the first end of the motorized conveying roller, comprising a single-part or multi-part main body and a pivot plate which is mounted on the main body in a seat so as to be rotatable about a pivot axis, which comprises an orifice which is oriented normally with respect to said pivot axis and which has guide surfaces extending normally with respect to the pivot axis, and the main body forms a first side wall part and a second side wall part extending above and below the pivot plate and extending normally with respect to the pivot axis which delimit the seat, and the pivot plate is mounted inside the seat on the first side wall part and second side wall part and is disposed so as to be pivotable about the pivot axis relative to the stationary main body, and the pivot bearing is mounted on the vertical web of at least the first frame profile by the main body of the pivot bearing via a releasable fixing device and is positioned relative to the first frame profile in such a way that the shaft of the motorized conveying roller extends through both one of the orifices in the vertical web and the orifice in the pivot plate, wherein in the first conveyor section in which the conveying rollers are disposed between the first and second frame profile with the respective shafts of the respective conveying rollers substantially normally with respect to the web, the first section on the first end of the motorized conveying roller is inserted directly in the first orifice and the third section on the second end of the motorized conveying roller is inserted directly in the second orifice, and in the second conveyor section in which the conveying rollers are disposed between the first and second frame profiles with the respective shafts of the respective conveying rollers at an angle to the web, the second section on the first end of the motorized conveying roller co-operates with the generally cylindrical orifice in the pivot plate of the pivot bearing.

11. Conveyor system according to claim 10, wherein the guide surfaces extending normally with respect to the pivot axis co-operate with guide surfaces in the main body likewise extending normally with respect to the pivot axis and a torque acting on the pivot plate around the axis of the conveying roller is absorbed by the abutting guide surfaces of the pivot plate and the guide surfaces of the main body.

12. Conveyor system according to claim 10, wherein the pivot plate has at least one cylindrical pivot pin protruding normally to the guide surface and the main body is of a multi-part design, and a first bearing for seating said pivot pin is disposed in a first part or a first half-shell is disposed in a first part and a second half shell is disposed in a second part for seating said pivot pin.

13. Conveyor system according to claim 10, wherein the pivot plate has two pivot pins which are mounted in two bearings or each in two half-shells.

14. Conveyor system according to claim 10, wherein the pivot plate is of a substantially square shape.

* * * * *